(12) United States Patent
Verbowski et al.

(10) Patent No.: US 7,698,305 B2
(45) Date of Patent: Apr. 13, 2010

(54) PROGRAM MODIFICATION AND LOADING TIMES IN COMPUTING DEVICES

(75) Inventors: Chad Verbowski, Redmond, WA (US); Juhan Lee, Issaquah, WA (US); Xiaogang Liu, Beijing (CN); Roussi Roussev, Melbourne, FL (US); Yi-Min Wang, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 568 days.

(21) Appl. No.: 11/566,170

(22) Filed: Dec. 1, 2006

(65) Prior Publication Data

US 2008/0133972 A1   Jun. 5, 2008

(51) Int. Cl.
   *G06F 17/30* (2006.01)
(52) U.S. Cl. .......................................... 707/200; 707/3
(58) Field of Classification Search ......... 707/200–205, 707/3; 717/172, 174–176, 168–178; 718/102, 718/106; 714/37, 43, 103; 710/36; 439/152
See application file for complete search history.

(56) References Cited

U.S. PATENT DOCUMENTS

| | | | |
|---|---|---|---|
| 6,041,333 A * | 3/2000 | Bretschneider et al. ..... 707/203 |
| 6,374,401 B1 | 4/2002 | Curtis |
| 6,557,054 B2 | 4/2003 | Reisman |
| 6,574,729 B1 | 6/2003 | Fink et al. |
| 6,735,768 B1 * | 5/2004 | Tanaka ....................... 717/174 |
| 6,775,657 B1 | 8/2004 | Baker |
| 6,980,927 B2 | 12/2005 | Tracy et al. |
| 7,024,548 B1 | 4/2006 | O'Toole, Jr. |
| 7,032,244 B2 | 4/2006 | Wilkes |
| 7,073,198 B1 | 7/2006 | Flowers et al. |
| 7,085,936 B1 | 8/2006 | Moran |
| 7,089,428 B2 | 8/2006 | Farley et al. |
| 7,124,409 B2 * | 10/2006 | Davis et al. ................. 717/178 |
| 2003/0023857 A1 | 1/2003 | Hinchliffe et al. |
| 2003/0046676 A1 * | 3/2003 | Cheng et al. ................ 717/173 |
| 2005/0010916 A1 * | 1/2005 | Hagen et al. ................ 717/170 |
| 2005/0080872 A1 * | 4/2005 | Davis et al. ................. 709/217 |
| 2005/0114285 A1 | 5/2005 | Cincotta |
| 2005/0187983 A1 * | 8/2005 | Narang et al. ............... 707/200 |
| 2006/0047713 A1 | 3/2006 | Gornshtein et al. |
| 2007/0128899 A1 * | 6/2007 | Mayer ........................ 439/152 |
| 2008/0066069 A1 * | 3/2008 | Verbowski et al. .......... 718/102 |

FOREIGN PATENT DOCUMENTS

WO    WO9641495    12/1996

OTHER PUBLICATIONS

Eskin, et al., "A Geometric Framework for Unsupervised Anomaly Detection: Detecting Intrusions in Unlabeled Data", retrieved at <<http://www.cse.ucsd.edu/~eeskin/papers/uad-dmsa02.ps>>, Department of Computer Science, Columbia University, pp. 1-20.

(Continued)

*Primary Examiner*—Debbie M Le
(74) *Attorney, Agent, or Firm*—Lee & Hayes, PLLC

(57) ABSTRACT

Systems and methods for implementing system management which are based on reviewing of the interactions between one or more programs and the persistent state they tend to represent. The system provides for detection of modifications that occur within a system, verifying whether the modifications are approved or not and generating notifications on detecting unknown modifications.

14 Claims, 11 Drawing Sheets

OTHER PUBLICATIONS

Lee, et al., "Automated Intrusion Detection Using NFR: Methods and Experiences", retrieved at <<https://www.usenix.org/events/detection99/full_papers/lee.lee.pdf>>, Proceedings of the Workshop on Intrusion Detection and Network Monitoring, Apr. 9-12, 1999, The USENIX Association, 1999, pp. 11.

Perumal, "Boar: An Autonomous Agent for Network Intrusion Detection Analysis", retrieved at <<http://csis.pace.edu/thesis/PerumalArchana.pdf>>, School of Computer Science and Information Technology, Pace University, Dec. 2004, pp. 48.

* cited by examiner

PROGRAM MODIFICATION AND LOADING TIMES IN COMPUTING DEVICES

BACKGROUND

A primary challenge to building a reliable and secure computer system is managing a persistent state (PS) of the system, which includes all the executable files, configuration settings, and other data that govern how the system functions. Misconfigurations and other PS problems are among the primary causes of failures and security vulnerabilities across a variety of systems ranging from individual desktop machines to large-scale Internet services. PS problems, along with problems caused by failures in system elements such as hardware components and programming logic, can deleteriously affect the entire system.

The cost of not effectively managing a system's PS is high. For example, PS problems can reproduce themselves after a system reboot or an application restart. In addition, PS state drifts during run-time due to changes such as patches and application related updates. Currently there exists no effective way to close the loop on changes occurring on the system. In such a scenario, if known problem identification fails, and if a subsequent system reboot/application restart fails to remedy the PS problem, there may be no choice but to manually examine the system to identify a root cause PS.

Manual investigation of a system to identify the root cause PS is difficult and expensive due to the large number of potential problems. For example, a potential set of state that can impact an application having trouble is huge, and correspondingly a potential root cause list can include a complete set of state on the system. Furthermore, the situation may be potentially worse if consideration is made of every possible combination of set as well, in particular for the case where there is not a single PS root cause.

SUMMARY

This summary is provided to introduce simplified concepts of model based license counting, which is further described below in the Detailed Description. This summary is not intended to identify essential features of the claimed subject matter, nor is it intended for use in determining the scope of the claimed subject matter.

In an embodiment, programs of computing-based device are cataloged and enumerated, last load times of programs registered with the computing-based device are acquired, and a comparison is made as to last modification times of files associated with the programs that are registered with the computing-based device with the last load times.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to reference like features and components.

DETAILED DESCRIPTION

To implement this, the system includes one or more computer programs or agents that report data associated with the modifications that occur within a system. The data includes information associated with all interactions with files and/or settings. Such types of interactions include activities like read and write access to registry entries, files, as well as binary module interactions such as load, and so on. The agents report the data collected to a back-end service which processes the reported information for activities like generating web-reports, alerts, or integrating with other services for performing system management. Furthermore, processing can be done on a single machine where the data is collected as well. This includes generation of reports, alerts, etc In particular, a persistent state (PS) of the system is addressed, where the PS includes all the executable files, configuration settings, and other data that govern how the system functions. Although persistent state is discussed, it should be appreciated the techniques and methods discussed are applicable to other kinds of states.

The data reported can be used for several purposes. For example, data can be examined to verify that interactions being instigated are in conformance with a set policy or are associated with an authorized interaction.

While aspects of described systems and methods for system management can be implemented in any number of different computing systems, environments, and/or configurations, embodiments of system analysis and management are described in the context of the following exemplary system architecture(s).

Exemplary System

Figure 1:
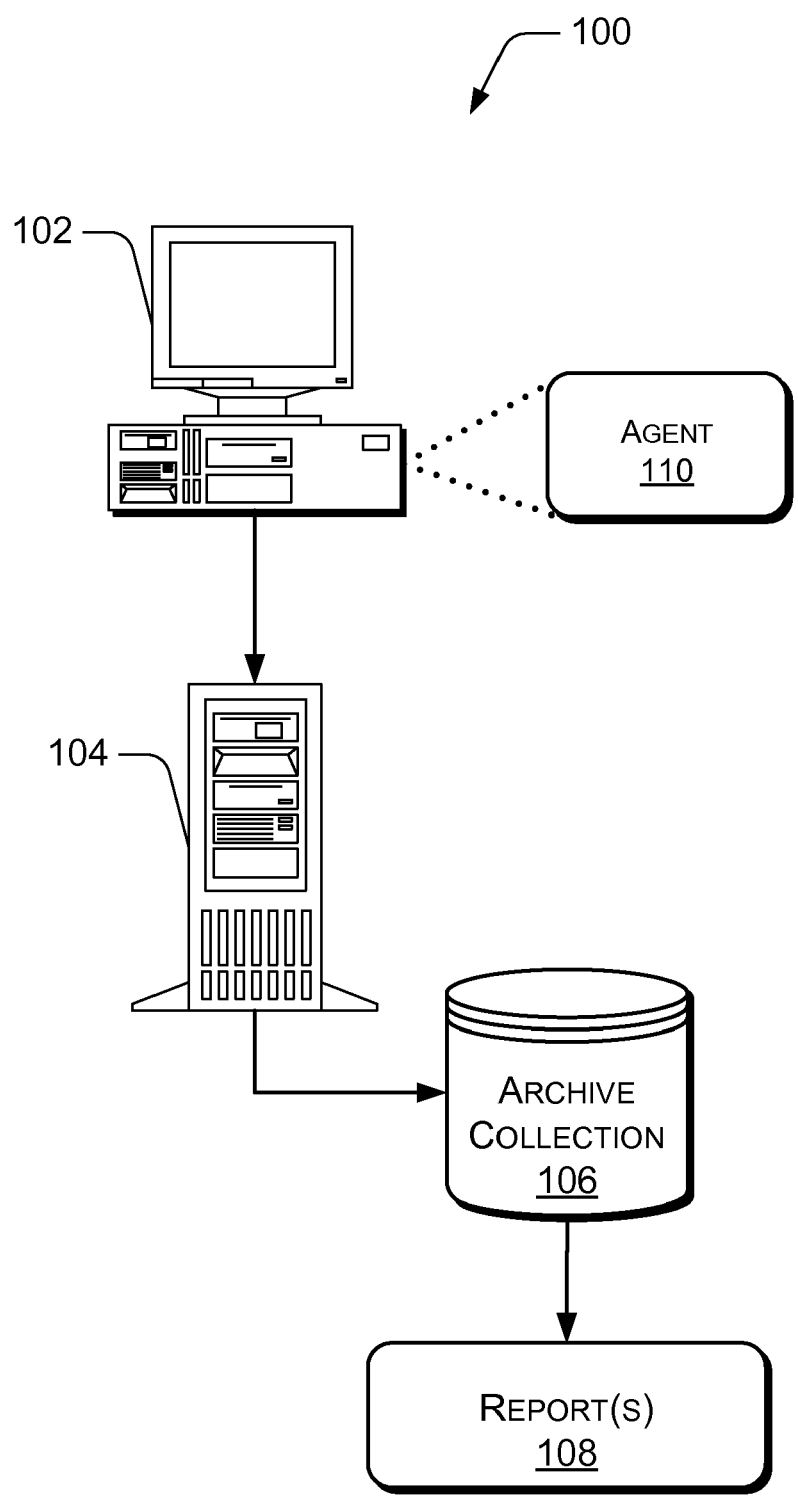
FIG. 1 illustrates an exemplary architecture for systems management.

FIG. 1 illustrates an exemplary computer system 100 in which the information associated with the interactions between on one or more programs can be collected and analyzed. The system 100 includes computing-based device 102 on which one or more programs are running or installed, a collection server 104, an archive collection 106 and report(s) 108.

The information associated with the interactions between one or more programs and/or file systems or settings, is representative of the modifications in the persistent state (PS) that may occur within system 100. The computing-based device 102 can include any number of computing-based devices 102. For example, in one implementation, system 100 can also include a company network, including thousands of office personal computers (PCs), various servers, and other computing-based devices spread throughout several countries, all acting as computing-based devices 102. Alternately, in another possible implementation, system 100 can include a home network with a limited number of PCs. Computing-based devices 102, can be coupled to each other in various combinations through a wired and/or wireless network, including a LAN, WAN, or any other networking technology known in the art.

Computing-based devices 102 can include an agent 110 capable of instrumenting functions in system 100 to capture information associated with interactions between one or more of computing-based devices 102 and/or file systems and settings. In one implementation, agent 110 can be a thread data recorder (TDR) capable of modifying, adding and/or deleting computer readable instructions in the function to intercept threads calling the function. In another possible implementation, instrumenting functions also includes modifying, adding and/or deleting computer readable instructions in a function to require a thread to execute computer readable instructions in the function that enable the capture of data associated with the thread. In yet another implementation, data associated with the thread includes information relating to a program with which the thread is associated, one or more interactions associated with the thread, and information relating to user of the program with which the thread is associated. Although a TDR is discussed, it should be appreciated that interception may not necessarily be needed for all algorithms, therefore the techniques and methods discussed may not necessarily be tied to TDR based data collection. Furthermore, virtual machine (VM) based instrumentation may be different than TDR based instrumentation where code is dynamically added. In a VM, it may be a hard-coded function of the VM internals to do this kind of collection.

The instrumented functions can include functions that might be called by a program/process. In one implementation, the instrumented functions can include low level chokepoint functions, such as file system drivers, registry functions, functions creating new processes and/or services, etc.

Data captured from threads by the thread data recorder can be stored and/or processed to regulate the behavior of system 100, and to investigate a condition or the persistent state of system 100. Types of data which can be captured from threads by thread data recorder, and the operation of thread data recorder is discussed in more detail in U.S. patent application titled "Thread Interception and Analysis" by Verbowski et al., application Ser. No. 11/993,749, filed on Oct. 31, 2007, which is hereby incorporated by reference.

Collection server 104 is responsible for collecting information in relation to the modification that may have occurred in system 100. In one implementation agent 110 stores the information associated with the interactions in collection server 104 as compressed logs. In yet another implementation, the information associated with the interactions can further be uploaded in archive collection 106. The analysis of the information collected in collection server 104 or archive collection 106 is used for the generation of report(s) 108. Report(s) 108 generated as a result of analysis performed on information collected on collection server 104 or archive collection 106 provides an insight into the interactions or modifications that may be occurring within one or more computing-based devices 102. In another implementation, report(s) 108 can be generated through a visual interface. In yet another implementation, the visual interface can be implemented through a browser for retrieving and displaying previously created and/or cached reports, for performing programmable data access of the information stored in collection server 104 or archive collection 106. Collection server 104 and archive collection 106 can reside or be part of a single device which serves either as collection server 104 or archive collection 106.

As indicated above, the information collected by agent 110 and stored in collection server 104 or archive collection 106 can be analyzed to provide an insight into the functioning of system 100. The analysis that is performed can include anomaly detection, change management, managing abnormal system activity, identifying security vulnerabilities, identifying unauthorized applications, performing compliance audit, and so on.

Figure 2:
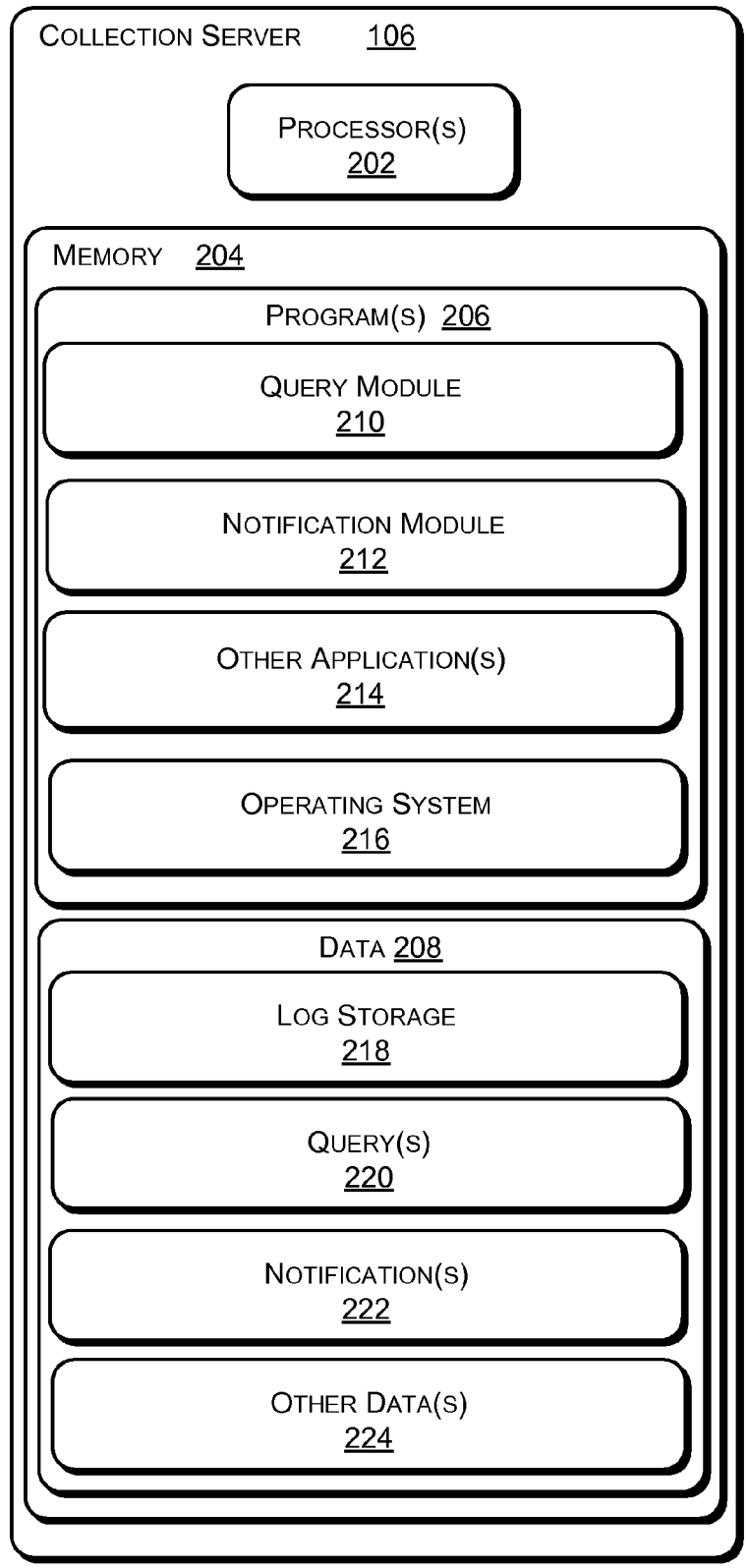
FIG. 2 illustrates an exemplary collection server.

FIG. 2 illustrates an exemplary collection server 106 configured to store, process and/or analyze data from agent 110. Collection server 106 includes one or more processor(s) 202 and a memory 204. Processor(s) 202 include, for example, microprocessors, microcomputers, microcontrollers, digital signal processors, central processing units, state machines, logic circuits, and/or any devices that manipulate signals based on operational instructions. Among other capabilities, processor(s) 202 are configured to fetch and execute computer-readable instructions stored in memory 204.

Memory 204 may be any computer-readable medium known in the art, for example, volatile memory (e.g., RAM) and/or non-volatile memory (e.g., ROM, flash, and so on). Memory 204 can also include program(s) 206 and data 208. Program(s) 206 can perform, among other operations, query-related processes on data associated with interactions between programs running on one or more computing-based devices 102 and file system and/or settings. Program(s) 206 further includes, for example, a query module 210, a notification module 212, operating system 214 and other application(s) 216. Operating system 214 provides an operational environment for the functioning of one or more of the modules in program(s) 206.

Query module 210 performs query-based operations on information collected by agent 110, such as information included in log storage 218. Information collected by agent 110 can also be retrievable from archive collection 106. Query(s) 220 includes a plurality of queries such as predefined queries. Such predefined queries can relate to conditions that relate to one or more policy definitions, such as security policy definitions, that may be prescribed for system 100. In such a case, any or all analysis that may be performed by query module 210 can be in conformance to such predefined policy definitions or predefined queries.

Query module 210 can restrict query(s) 220 to one or more attributes. Such attributes can include filename, application type, time of execution, and so on. When functioning on the basis of a restricted query, query module 210 scans all information that is stored in log storage 218 and/or archive collection 106, for values that indicate the presence of the attribute. For example, if an individual wishes to search archive collection 106 for data related to a certain application such as a word processor, query module 210 searches for entries or events associated with the interactions that have been initiated and affected by the word processor.

Query(s) 220 can include queries entered or programmed by one or more individuals or entities, such as a system administrator. For example, query(s) 220 can include instructions to detect all interactions associated with a given user ID. Furthermore, query(s) 220 can include instructions to detect all interactions associated with an application running on one or more of the computing-based devices 102.

Referring back to the collection server 104, the analysis of the information, associated with interactions of one or more computing-based devices 102 with file systems and/or settings, is to be performed to determine the functioning and/or persistent state of system 100. Query module 210 can be used to perform analysis on information collected by agent 110 and stored in log storage 218 and/or archive collection 106. Query module 210 can implement this by performing a search of log storage 218 and/or archive collection 106 using one or more queries as specified in query(s) 220. Results generated by the execution of query(s) 220 are indicative of the interactions between one or more of the computing-based devices 102 and the file systems and/or settings.

Query module 210 can instruct notification module 212 to issue a notification for the results generated as a result of the execution of query(s) 220. The notification generated by notification module 212 can be stored in notification(s) 222 in data 208. The notifications issued by the notification module 212 can also be stored in an external database, like an external storage device. Notification module 212 can also be instructed by query module 210 to communicate the notifications generated as a result of execution of query(s) 220.

Query module 210 can search log storage 218 and/or archive collection 106 to detect deviations in information associated with interactions between one or more computing-based devices 102 with respect to query(s) 220 being executed by query module 210. In such a case, detection of such deviations in relation to certain interactions can again be notified by notification module 212 and corresponding notification(s) 222 can be communicated to individuals, like system administrator or computing systems for storing notifications for reference in future.

Notification module 212 is also capable of providing contextual information associated with the notification(s) 222. The contextual information may additionally specify the setting that may be associated with the corresponding interaction. Contextual information can be annotated to the relevant notification(s) 222 in one or more stages. For example, one level provides statistical information related to the number of machines that may have a program installed on them, most common version of files and so on. Another level of annotation indicates the comparison of hash values of the installed files with a data collection that indexes attributes for example, program name, version information and so on. Yet another level of annotation can be present that may provide for comments or any subsidiary information, related to known problems, vendors and so on. Additional levels of annotation may be implemented thereby specifying additional attributes in relation to associated notification(s) 222. Notification(s) 222 can also be displayed through a visual interface allowing individuals, for example system administrator, to review the notification(s) 222 and take appropriate actions for required cases.

Query module 210 can be used for the detection of noted changes that occur within system 100 due to the interaction between programs running on one or more computing-based devices 102 and file systems and/or settings. Noted changes include changes or modifications to the PS of a system that may result due to the unexpected execution of a program, operating system, programs that are used for accomplishing specific business tasks like accounting and other programs. Such noted changes to the PS of a system are authorized and controlled to prevent undesirable situations like choked performance of system, security issues and so on. It would also be noted that all changes that occur in PS are not noted changes.

Noted changes can be annotated by an identifier and classified as per the annotation allotted. Annotation of noted changes can be performed by specifying a classification rule by query module 210. Based on the parameters specified in the classification rule, appropriate parameters are associated with certain attributes related to the noted change. For example, query module 210 associates each match of a substring contained in a classification rule to name or type of modification contained in each noted change. Classifications for the noted changes can be assigned on the basis of a priority value. For example, in such a case, matches to a classification substrings with higher priority take precedence over classification substrings with lower priority. Classification substrings with higher priority are then determinate as the relevant classification for the relative noted change.

Noted changes can be classified by labeling the changes as at least one or more of the following classifications:

Problem: Indicates a known problem or results from the existence or removal of the instant PS.

Install: Indicates change in PS as a result of an installation or upgrade.

Setting: Indicates changes made to configuration settings or configuration PS.

Content: Indicates web pages, images, textual and user data.

Management Change: Indicates installation, patching, or configuration changes made to programs responsible for management of system running on the system.

Unauthorized: Indicates installation of unauthorized or prohibited applications, or configuration changes that include prohibited values.

User Activity: Indicates changes in PS as a result of users logging in or running window applications.

Noise: Indicates temporary or cached PS.

Unknown: Indicates unclassified PS.

Additional annotations can be provided to further classify noted changes and make them discernable from other changes.

Query module 210 can also be used for determining the status of a program running on system 100 as authorized or unauthorized. This is based on the need that only authorized processes or programs should be running on system 100. Query module 210 determines the status of a program running on system 100 as authorized or unauthorized by comparing attributes as specified in query(s) 220 and the attributes that define a specific change or modification in PS of a system. For example, query module 210 executes query(s) 220 that specifies an application type as an unauthorized program. Results obtained as a result of the execution of query(s) 220 contain information in relation to changes in PS that have occurred in response to execution of the specified application type. Query module 210 on obtaining the results marks such results as changes induced by the execution or action of an unauthorized program.

Query module 210 can compare the attributes specified in a predefined list of approved and/or unapproved programs, with attributes that define a specific change or modification in PS of a system. The list in the instant case may contain a specific number of approved or unapproved programs. Programs running on system 100 that are similar to the programs identified as unapproved in the predefined list are marked as unauthorized programs.

Approved and/or unapproved programs specified in the predefined list may also contain additional information, like a label, attributing the nature and/or various characteristics of the programs. Examples of such additional information include labels such as "approved", "type", "category", "function", "product information", "manufacturer information", and "product description". For example, programs that are labeled as "approved" are considered authorized programs for running on one or more of the computing-based devices 102 in system 100; and a "category" label specifies the intended use of the program.

Changes or modifications performed by a program for the first time are by default not approved and marked as "unauthorized". For example, upon detecting changes or modifications by a program for the first time, the query module 210 marks the program and its associated interactions as "unauthorized". Such programs that have been marked as "unauthorized" can be notified by notification module 212 for review, for example by a system administrator, for performing diagnostics if necessary or for a pending approval. If an approval is obtained then the approved program is further associated with an appropriate label attributing the program, and can also be added to the predefined list containing the approved and/or unapproved programs.

Query module 210 can also detect extensibility points (EP). EPs are interactions that are indicative of dynamic loading and execution of instructions associated with a program or an operating system running on one or more of computing-based devices 102. For example, when a first program, such as a word processor, a spreadsheet application and so on, running on one or more of computing-based devices 102 starts up, the first program may also trigger instructions associated with other programs, such as add-on programs, that provide additional functionality to the running of the first program. In this way, the running of the first program can generate various interactions, including interactions between the first program and file system, and interactions between the other programs providing additional functionality to the running of the first program and the file system. Such information can provide insight into the functioning of the system on which the first program was installed and also to speculate the impact that such installations may produce onto the system.

The information associated with various interactions generated as a result of the running of the first program can be intercepted and copied by, for example, agent 110. Event information associated with the various interactions can be stored as compressed logs in log storage 218 and/or archive collection 106. Although the event information is stored in compressed storage, it is to be appreciated that compressed storage may not be necessarily used; however, the use of compressed storage makes the system more scalable by having the storage take up less space. The stored event information can be reviewed by entities, such as a system administrator, or by query module 210 to detect interactions associated with the first program and the other programs with the file system. In this way, the other programs if associated with the running of the first program can be detected.

Query module 210 can also be used to detect direct EPs for the first program. For example, query module 210 can detect direct EPs by isolating interactions which both (1) pertain to various programs loaded in system memory for execution before the execution of the first program, and (2) reference the first program or are associated with the running of the first program.

In one exemplary implementation, query module 210 can identify potential direct EPs for the first program by querying log storage 218 and/or archive collection 106 for interactions pertaining to various programs loaded in system memory for execution before execution of the first program. For example, query module 210 can query for interactions pertaining to various programs loaded in system memory for execution within a given time range, such as 1 second, before the execution of the first program. Query module 210 can identify direct EPs for the first program from the potential EPs by querying the potential EPs for interactions that reference the first program or are associated with the running of the first program. Direct EPs can be stored in other data(s) 224.

Query module 210 can also be used to detect indirect EPs. For example, returning to the first program example above, query module 210 can query log storage 218 and/or archive collection 106 for interactions which reference, or which are associated with, the direct EPs. Such interactions may be termed indirect EPs. Indirect EPs can be stored in other data(s) 224.

Query module 210 can also be used to detect a presence of malicious software applications by monitoring direct EPs. Malicious software applications can include "spyware", "Trojan horses", "worms", "viruses", etc., which under normal circumstances would not be associated with a program. For example, query module 210 can compare EPs for a program running on one or more of computing-based devices 102 against control EPs for the same program found when the program was running on computing-based devices 102 in the absence of malicious software. Differences between the EPs and the control EPs can be examined by entities such as query module 210 and/or a system manager, to determine if the differences indicate the presence of malicious software running in conjunction with the program. Malicious software found using EPs can be removed from the effected computing-based device 102 by query module 210, the system administrator, and so on.

In another implementation, query module 210 can be used for generating notification(s) 222 by notification module 212 in response to the detection of EPs. In yet another implementation, notification(s) 222 that are generated can further be viewed or retrieved through a visual interface facilitating the reviewing of the notification(s) 222 by an individual like a system administrator for further analysis or for performing a required diagnostic.

Figure 3:
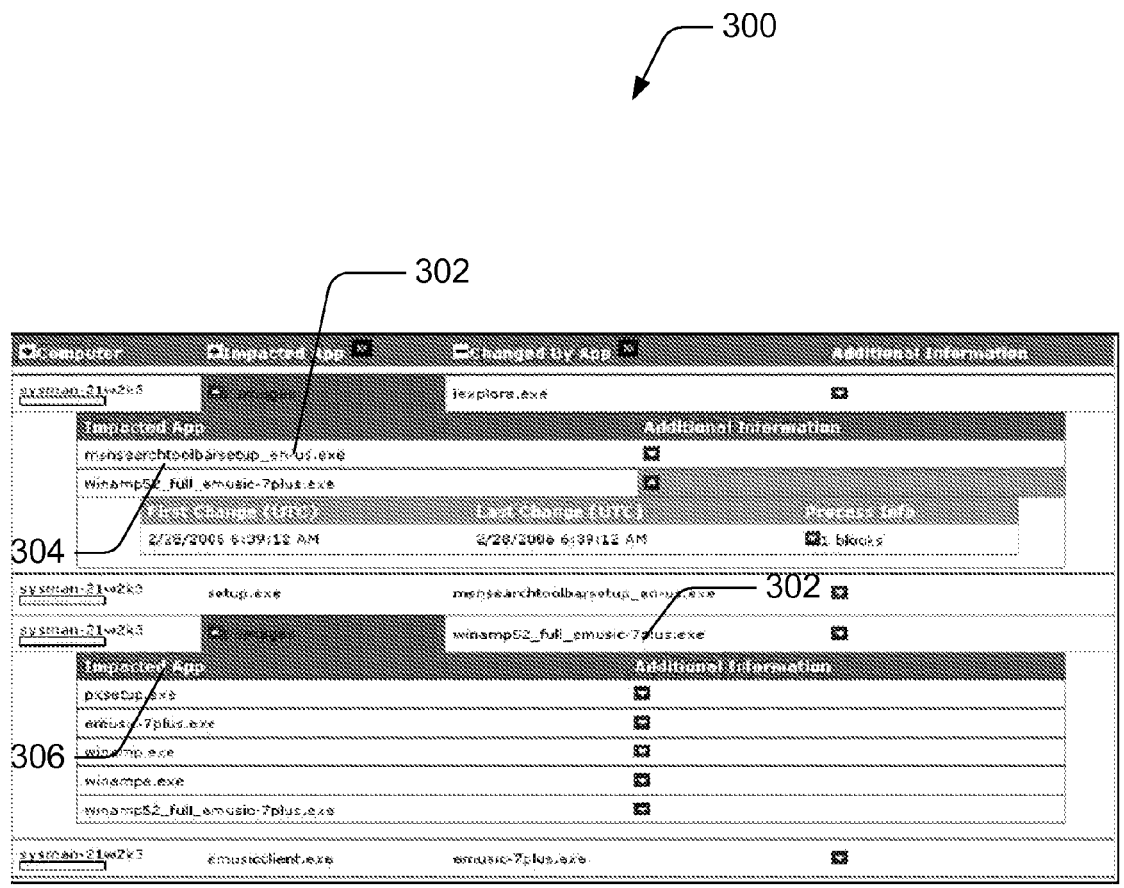
FIG. 3 illustrates an exemplary visual interface depicting generated notification.

FIG. 3 illustrates an exemplary visual interface 300 that depicts the generated notification(s) 222 in one of the possible implementations. In the illustrated implementation, visual interface 300 depicts downloads that have been performed by a first program (e.g., a web browser), on its execution. Visual interface 300 depicts in segment 302 and 304 a list of programs that were downloaded by the first program (in the example shown in FIG. 3, in particular "MSN Search Toolbar" and "Winamp Media Player"), during its execution. In the illustration it can be seen in segment 306 that the download of the programs as seen in segments 302, 304 also results in the creation of program files corresponding to programs other than the first program and programs illustrated in segments 302, 304. A visual representation in the form of visual interface 300 thus provides a list of programs that inadvertently get installed on one or more of computing-based devices 102 of system 100 while executing, downloading, and/or installing the first program.

Segment 306 can also indicate the impact or the modifications in PS of system 100 as a result of the installation or execution of programs other than the first program. Further execution of a program or programs other than the first program may be dependent on the execution of the first program. For example, as illustrated the "MSN Search Toolbar" may get activated on the execution of program files of the first program. A determination to this effect can be implemented by detecting the EPs corresponding to the first program. By monitoring the EPs associated with the first program, instances of program execution of other programs depending on the execution of the first program can be detected and corrective action be taken, if necessary.

Figure 4:
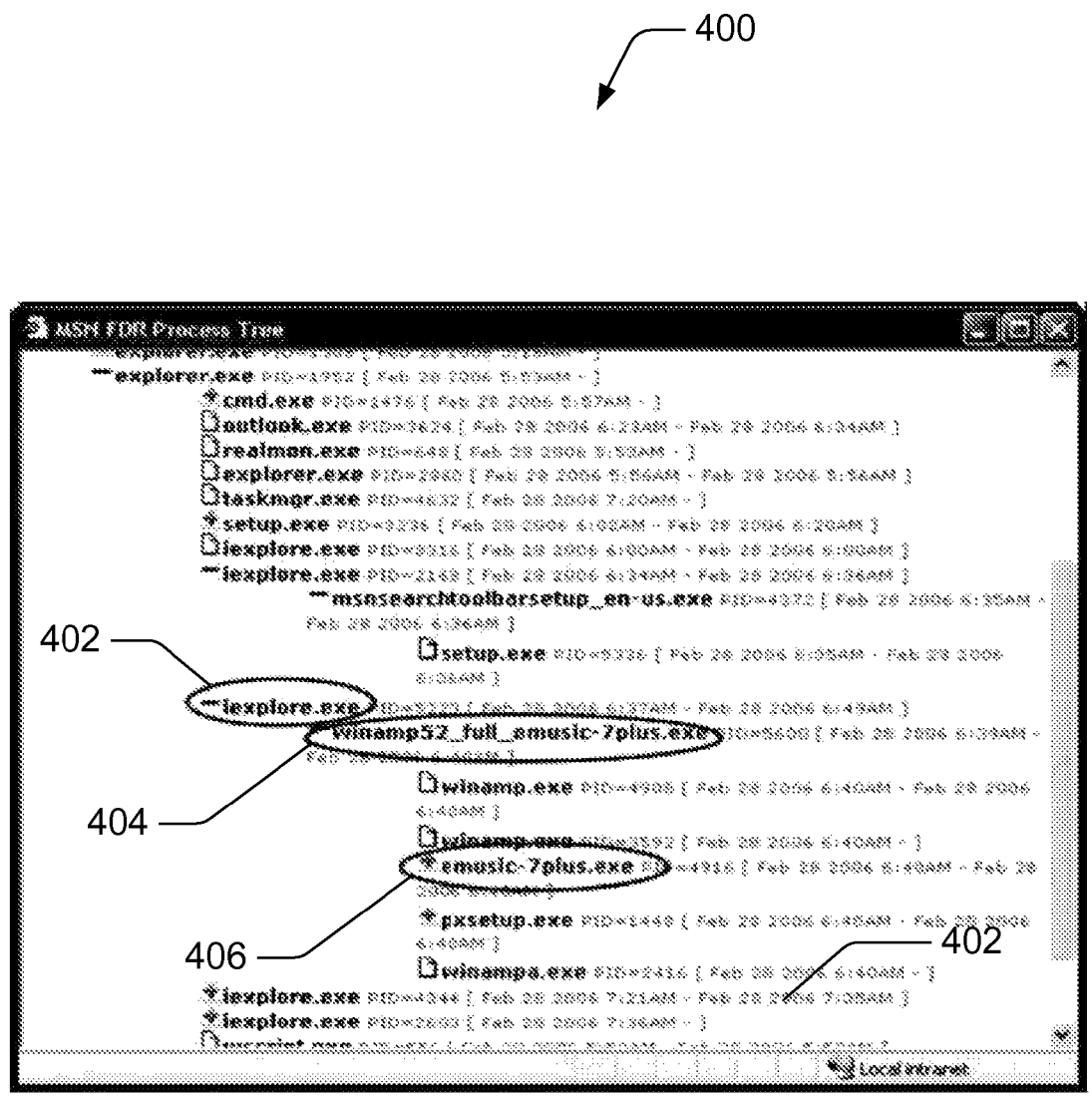
FIG. 4 illustrates an exemplary visual interface depicting the dependency of execution of one program on the execution of a first program.

Instances of execution of other programs that are dependent on the execution first program can also be displayed through another visual interface 400, as illustrated in FIG. 4. FIG. 4 illustrates the execution of a first program depicted as segment 402, for example "iexplorer.exe", induces the execution of Winamp depicted as segment 404 which in turn further executes the "emusic.exe" depicted as segment 406. From such an illustration, detection of EPs associated with the first program can be implemented in detail and through visual means.

Query module 210 can be used to detect leaked PS. Leaked files include files or registry settings that are left on a system, such as system 100, after a program that created the files or registry settings is uninstalled. It may also include files or settings that may have been created as a result of an installation, for example temporary files, but failed to be deleted after the installation process was complete. Furthermore, another class of PS may be leaked, such as PS that are generated during the runtime of the program (i.e., after installation). Examples of these are state that may be generated on first use or extensions to the program that are installed separately after the initial install.

To detect leaked files, query module 210 catalogues installation files and settings changes associated with each program loaded onto system 100, which may be tracked through the use of programs as well as initial installation. Later, if the program is uninstalled, a corresponding catalog of installation files and configuration or registry settings for the program can be recalled, and system 100 can be checked to make sure all installation files and registry settings have been removed or reset. To detect leaked files on computing-based device 102 query module 210 catalogues installation files by running a scan through one or more computing-based devices 102 to detect all programs, such as applications, installed on computing-based devices 102.

Query module 210 can also acquire a list of all programs registered in an installer database of operating systems of the one or more computing-based devices 102. Examples of installer databases include components which produce a populated list of programs installed on a computing-based device under consideration.

Query module 210 queries log storage 218 and/or archive collection 106 for registry configurations or settings information and for enumerating a list of programs registered with operating systems of computing-based devices 102. Query module 210 can then scan log storage 218 and/or archive collection 106 to enumerate the files and registry entries, which can be ge generalized to all PS, of all programs installed on computing-based device 102. In order to enumerate the files and registry entries, query module 210 can query for all files and registry entries corresponding to one or more attributes, for example program IDs, of the programs installed on computing-based device 102.

If a file or setting on computing-based device 102 is not included in the files and registry entries corresponding to the program IDs of the programs installed on computing-based device 102, then query module 210 can deduce that the file or setting is a leaked file. Leaked files can be removed by query module 210, or various other programs, including an operating system, a system administrator, and so on.

The leaked files (PS) detected can be displayed through a visual interface allowing individuals, for example system administrator, to review the leaked files and take appropriate actions for required cases. Furthermore, the displayed leaked files (PS) and associated information can be stored in an external storage collection, for example an external database, for future reference. The leaked PS list can be used to automatically remove the leaked state by systems when the main application is removed. This leaked PS list can also be used to associate each PS on the system with an owner application.

Query module 210 can detect stale processes due to changed files, settings, or stale modules, including common misconfigurations, old software versions, and so on. Stale processes occur when, for example, software upgrades fail to restart affected processes after replacing on-disk executable files, program files, or settings. As a result, the computing-based device on which the stale process is found will disregard the upgrade and continue to execute based on the old executable files, program files, or settings.

To detect stale processes, query module 210 can query information associated with interactions of programs stored in log storage 218 and/or archive collection 106. Query module 210 queries log storage 218 and/or archive collection 106 for the last-load time of programs installed on one or more of computing-based devices 102. Query module 210 can also query log storage 218 and/or archive collection 106 for the last-load time of files or registry settings associated with the software installed. In one exemplary implementation, query module 210 queries log storage 218 and/or archive collection 106 for the last-load time of files or registry settings associated with the software associated dynamic link libraries (DLLs) installed with the software. Query module 210 can also query log storage 218 and/or archive collection 106 for the time or date of the last modification of the software installed on the computing-based device. Such modifications include, for example, accesses performed on one or more files or program settings associated with the last known version of the installed software.

In case the last load time of the software is later than the time or date of the last known modification of the software, inconsistencies resulting from the software not utilizing the last loaded update, may occur. Such inconsistencies, if detected by the query module 210, can be noted and corrected by an individual such as a system administrator.

The detected stale files can be displayed through a visual interface allowing individuals, for example system administrator, to review the stale files and take appropriate actions for required cases. The displayed stale files and associated information can be stored in an external storage collection, say an external database, for future reference.

Query module 210 can detect occurrences of known unwarranted programs including software applications such as "malware, "spyware", "Trojan horses", "viruses", etc. To accomplish this, query module 210 can query and search log storage 218 and/or archive collection 106 for programs loaded for execution in memory of one or more of computing-based devices 102. The programs loaded for execution in memory may then be compared by, for example query module 210, against a list of known unwarranted programs.

For example, query module 210 can detect occurrences of programs loaded for execution in memory on computing-based device 102 on the basis of identifiers, such as program IDs, associated with the programs. Query module 210 can then compare the identifiers of the programs loaded for execution in memory on computing-based device 102 against a list of identifiers, such as program IDs, of known unwarranted programs. If an identifier of a program loaded for execution in memory matches an identifier of a known unwarranted program, query module 210 may implement the removal of the program loaded for execution in memory from computing-based device 102. In one possible implementation, the list of identifiers of known unwarranted programs can be entered, at least in part, by a system administrator.

The unwarranted program detected by query module 210 can be displayed through a visual interface allowing individuals, such as a system administrator, to review the unwarranted program and take appropriate actions for their removal. The displayed unwarranted program and associated information can be stored in an external storage collection, for example an external database, for future reference for detecting same or similar unwarranted programs.

An unidentified program on one or more computing-based devices 102 which does not have an identifier associated with it can be detected by query module 210 and reported to a system administrator to ascertain whether the unidentified program is an unwarranted program or not. The system administrator can examine the nature of the unidentified program by reviewing the list of unidentified programs, in the form of a report. Reviewing by system administrator may include examining a purpose of the unidentified program, dependence of the unidentified program on other programs, and to determine if the unidentified program is unwarranted. Additionally, the system administrator can review past experience with programs having characteristics similar to those of the unidentified program to determine if the unidentified program is unwarranted.

If the system administrator determines that the unidentified program is unwarranted, the system administrator can implement the removal of the unidentified program from computing-based devices 102. For example, the system administrator can remove the unidentified program itself, or the system administrator can instruct elements of computing-based device 102 to remove the unidentified program.

Additionally, the system administrator may on the basis of a generated report or one or more of notification(s) 222, assign an identifier, such as a program ID, to the unidentified program, and include the identifier on a list of unwarranted programs. In this way, if the unidentified program reappears on computing-based device 102 it can be quickly identified as an unwarranted program on the basis of the associated identifier. Moreover, the removal of the unidentified program can be implemented by elements of computing-based device 102, agent 110 and so on.

The unidentified programs and their associated processes detected by query module 210 can be displayed through a visual interface allowing individuals, for example system administrator, to review the unidentified programs and take appropriate actions for their removal. The displayed unidentified program and associated information can be stored in an external storage collection, say an external database, for future reference for detecting same or similar unwarranted programs. Furthermore, the unwanted changes may also be identified and/or tracked.

Query module 210 can block copy files to network drives or removable locations by vetoing writes to such locations by a program running on one or more of the computing-based devices 102. Query module 210 can also review previous such vetoing writes performed for auditing purposes so as to prevent such writes in future.

Exemplary Methods

Exemplary methods for thread interception and analysis are described with reference to FIGS. 1 to 4. These exemplary methods may be described in the general context of computer executable instructions. Generally, computer executable instructions can include routines, programs, objects, components, data structures, procedures, modules, functions, and the like that perform particular functions or implement particular abstract data types. The methods may also be practiced in a distributed computing environment where functions are performed by remote processing devices that are linked through a communications network. In a distributed computing environment, computer executable instructions may be located in both local and remote computer storage media, including memory storage devices.

Figure 5:
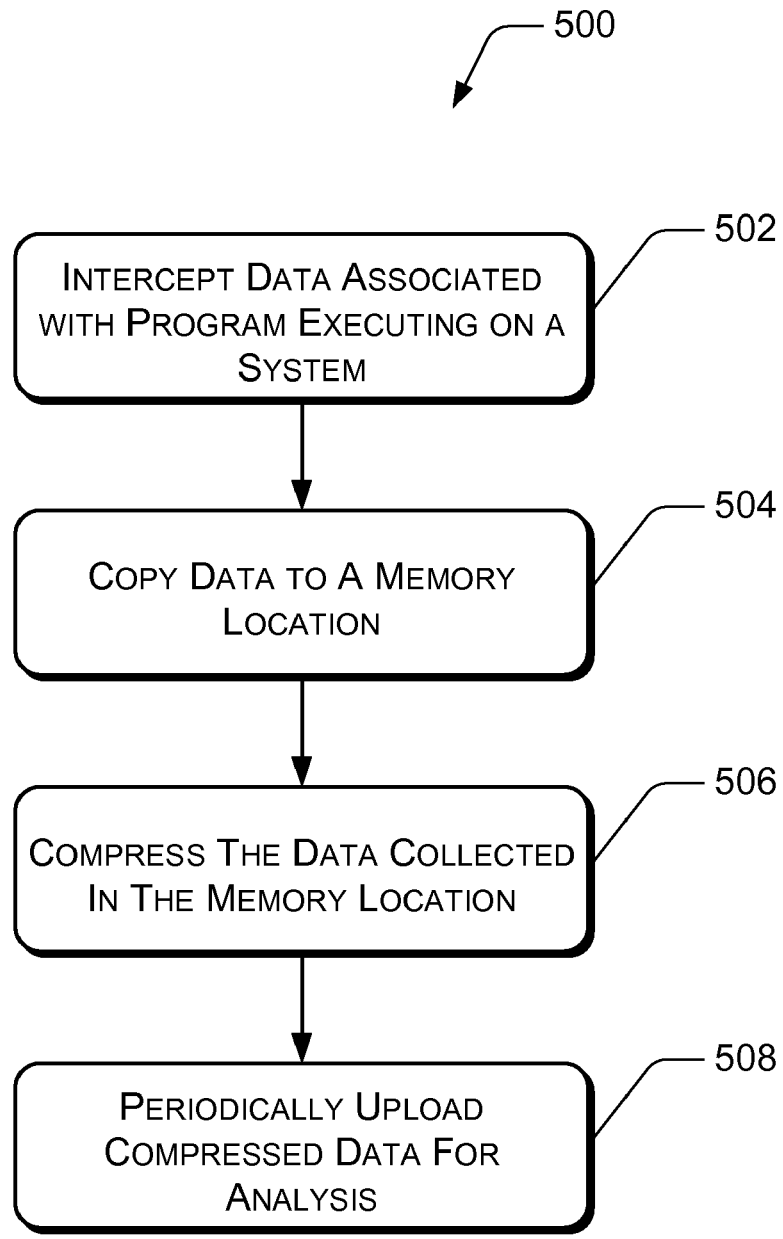
FIG. 5 illustrates exemplary method(s) for capturing data associated with modification in PS of a system.

FIG. 5 illustrates an exemplary method 500 for capturing and collecting information that is associated with interactions between programs running on one or more of computing-based devices 102 and/or file systems and settings. The order in which the method is described is not intended to be construed as a limitation, and any number of the described method blocks can be combined in any order to implement the method, or an alternate method. Additionally, individual blocks may be deleted from the method without departing from the spirit and scope of the subject matter described herein. Furthermore, the method can be implemented in any suitable hardware, software, firmware, or combination thereof.

At block 502 information or data associated with a program running or executing on a system is intercepted. In one implementation, said information is collected when a program/process calls an instrumented function including a modified function code. For example, the computer readable instructions can be modified to instruct the one or more functions to capture data associated with interactions between program running on one or more of computing-based devices 102 and/or file systems and settings. In an implementation, a Virtual Machine applies data collection logic directly when it interprets original code executing. This technique would not require modification of the original code. Similarly this could be implemented directly in processor hardware.

An agent, such as agent 110, can instrument one or more functions in system 100. The one or more functions can be instrumented by modifying computer readable instructions associated with the one or more functions.

An agent 110, such as thread data recorder, can intercept threads calling modified functions in system 100. Programs with which the threads are associated may be running in one of several operating layers, such as program layer, middleware layer, operating system layer, and so on. A file system with which the program may be trying to interact can include files (such as data files, executable files), and settings information (such as configuration settings or registry settings), and so on.

At block 504, various information or data associated with execution of programs running on one or more of computing-based devices 102 are collected in or copied to a memory location. Information associated with interactions of programs with file system and/or settings including interaction being instigated by modified functions, is copied and transmitted into a memory location. For example, agent 110 can copy all or selected data associated with the interactions and store the data in a memory location, such as collection server 104. Data associated with the interactions can include information regarding interactions instigated by the instrumented function.

At block 506, data stored in the memory location is compressed. In one implementation, the compressed data can be stored in another memory location. For example, the compressed data can be stored in log storage 218 in collection server 104 and/or archive collection 106.

At block 508, the compressed data is periodically uploaded for analysis. The compressed data may be uploaded to a collection server 106 or to a memory location serving as a collection server 106. The periodicity of uploading the compressed data for analysis can be varied. In one implementation, the compressed data is uploaded after specified intervals of time. In another implementation, the compressed data can be uploaded when the compressed data exceeds a predefined threshold limit of memory.

Figure 6:
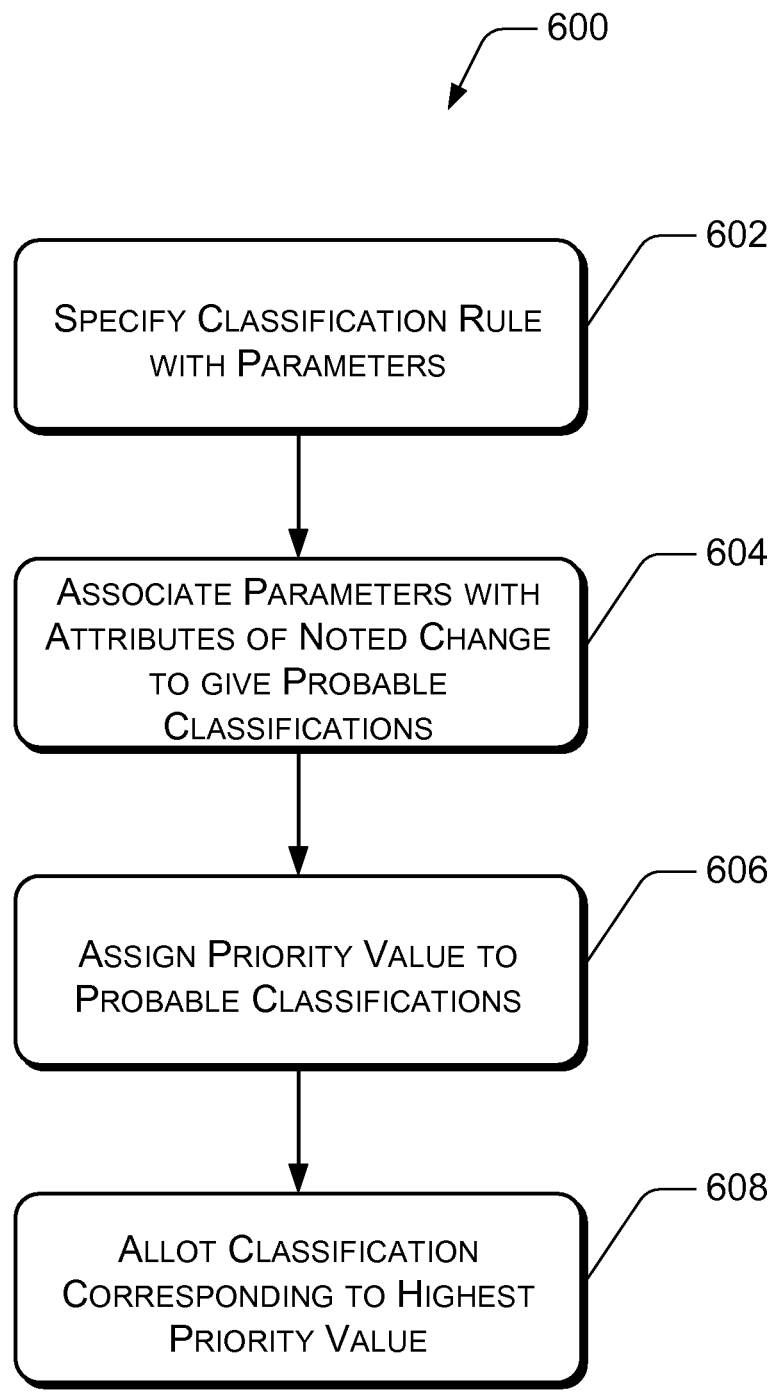
FIG. 6 illustrates exemplary method(s) for classifying noted changes.

FIG. 6 illustrates an exemplary method 600 for classifying noted changes. Noted changes include changes or modifications that may occur due to an unexpected execution of a program, operating system, programs that are used for accomplishing specific business tasks like accounting and other programs. The order in which the method is described is not intended to be construed as a limitation, and any number of the described method blocks can be combined in any order to implement the method, or an alternate method. Additionally, individual blocks may be deleted from the method without departing from the spirit and scope of the subject matter described herein. Furthermore, the method can be implemented in any suitable hardware, software, firmware, or combination thereof.

At block 602 a classification rule attributed by various parameter values is specified. For example, the classification rule can be specified by query module 210 along with the parametric values that define the classification rule.

At block 604, parameters defining the classification rule are associated with the one or more attributes that define the nature and characteristics of a noted change. Query module 210 associates the parameters defining the classification rule with the attributes characterizing the noted change. Association of one or more parameter values with the attributes characterizing the noted change in consideration results in a set of probable classifications. For example, query module 210 associates each match of a substring contained in a classification rule to PS name contained in each noted change.

At block 606, one or more of the probable classifications are assigned a priority value. Query module 210 can assign a priority value to one or more of the probable classifications. For example, a specific noted change occurring for a longer period of time will be assigned a higher priority value.

At block 608, the probable classification with the highest priority value is allotted to the noted change in consideration. In one implementation, query module 210 determines the highest priority value allotted to the probable classifications and assigns that classification to the noted change in consideration.

Figure 7:
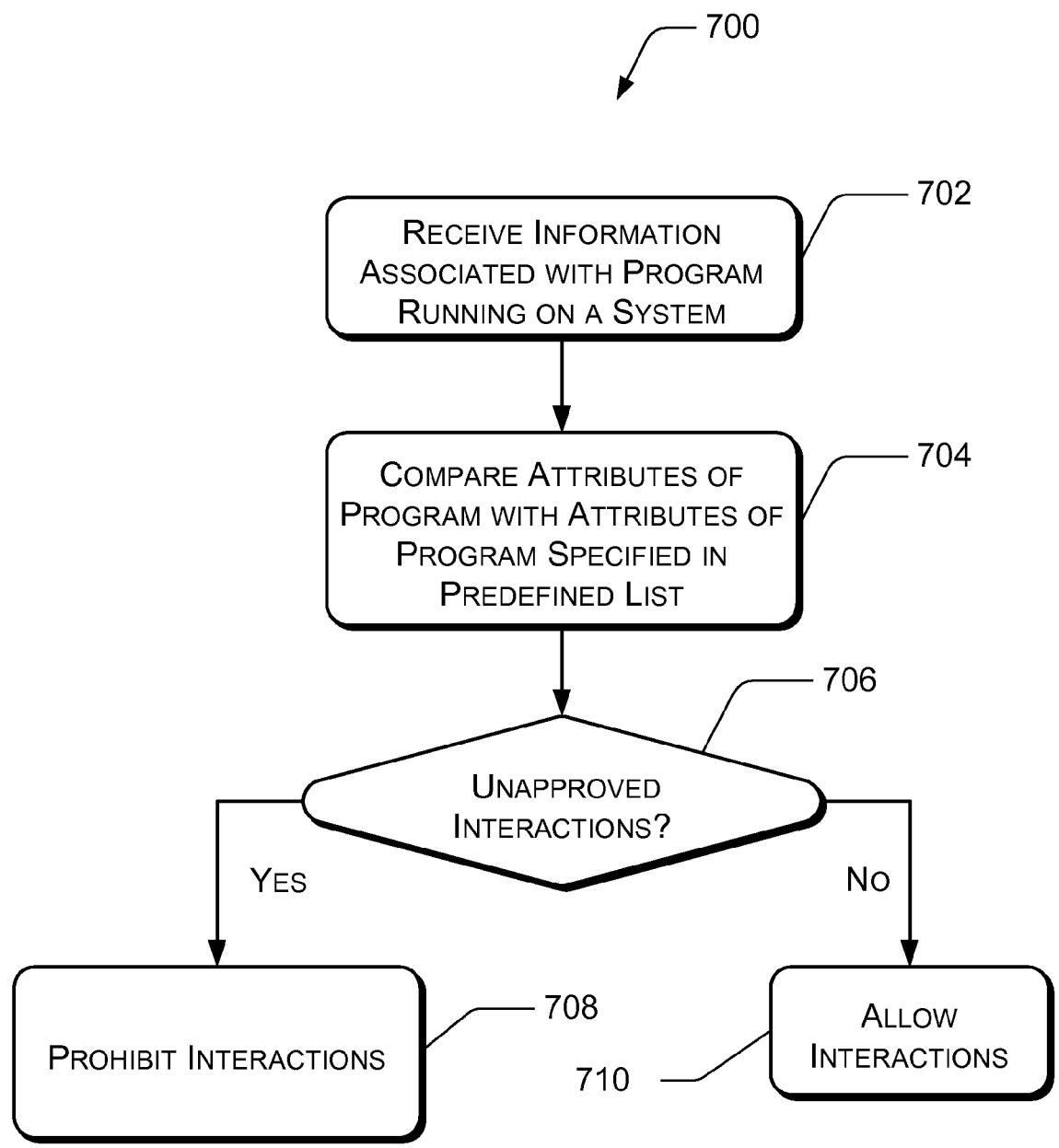
FIG. 7 illustrates exemplary method(s) for prohibiting execution of unauthorized interactions.

FIG. 7 illustrates an exemplary method 700 for prohibiting execution of unauthorized interactions—as defined by a system administrator, for example—on one or more computing-based devices 102. Examples of unauthorized interactions include read and/or write actions performed on a file system by an entity or program not authorized to perform such an action.

The order in which the method is described is not intended to be construed as a limitation, and any number of the described method blocks can be combined in any order to implement the method, or an alternate method. Additionally, individual blocks may be deleted from the method without departing from the spirit and scope of the subject matter described herein. Furthermore, the method can be implemented in any suitable hardware, software, firmware, or combination thereof.

At block 702, information associated with a program running on a system is received. The information is associated with the interactions between the program and file system and/or configuration settings. Query module 210 may query log storage 218 and/or archive collection 106 for information in relation to the interactions performed by a program on one or more of computing-based devices 102. The information obtained by the execution of the query is characterized by one or more attributes.

At block 704, attributes of the program running on system is compared with attributes of a plurality of approved and unapproved programs/processes included in a predefined list. For example, query module 210 compares the attributes, say program type, of the program and the attributes of the programs included in the predefined list.

At block 706, it is determined whether the attributes corresponds to that of an unapproved program/process or interactions. For example, if the attribute of the program running on system 100 corresponds to an attribute associated with unapproved interactions (i.e., 'yes' path from block 706), the interactions associated with program are not allowed to proceed (i.e., block 708). Alternately, if the attribute of the program running on system 100 does not correspond to an attribute associated with unapproved interactions (i.e., 'no' path from block 706), the interactions associated with the programs are allowed to proceed (i.e., block 710).

Figure 8:
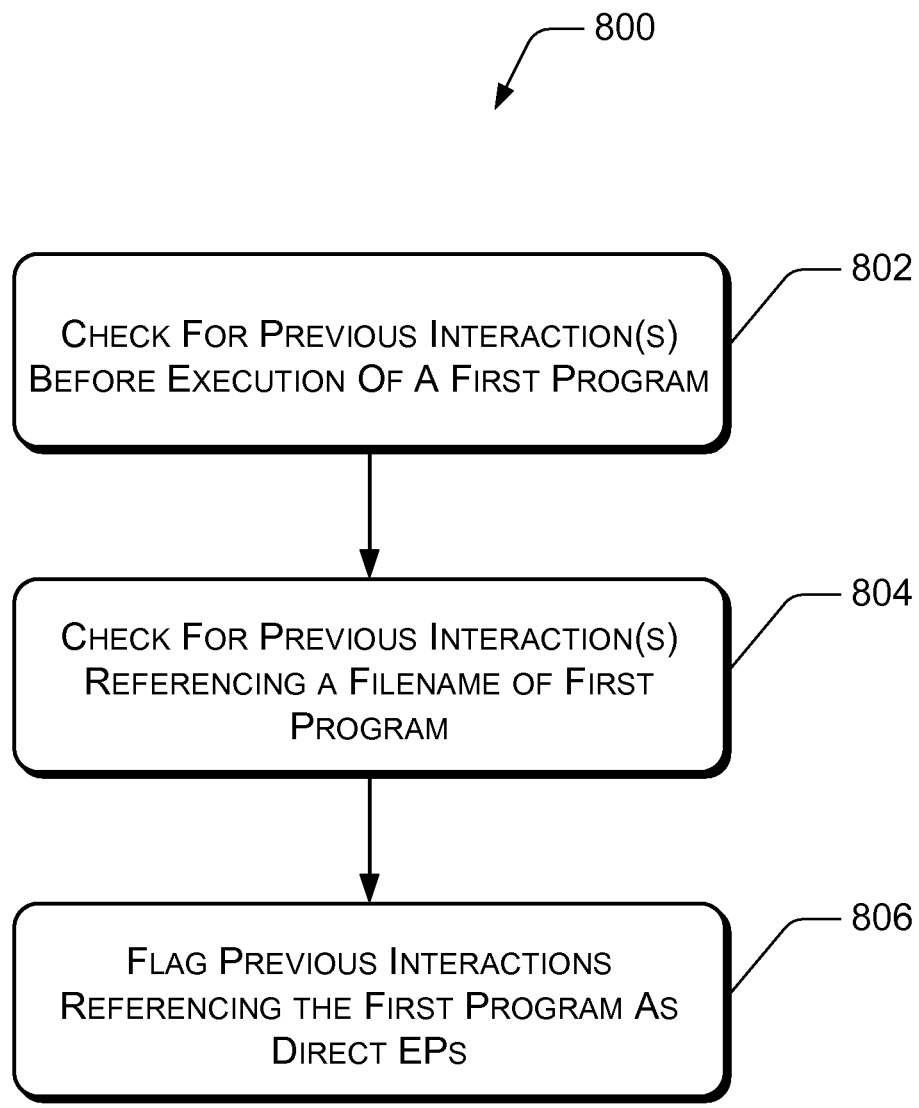
FIG. 8 illustrates exemplary method(s) for detecting one or more extensibility points.

FIG. 8 illustrates an exemplary method 800 for detecting one or more extensibility points (EPs) of a program installed on one or more computing-based device(s) 102. EPs include interactions that control the dynamic loading and execution of a computer application. The order in which the method is described is not intended to be construed as a limitation, and any number of the described method blocks can be combined in any order to implement the method, or an alternate method. Additionally, individual blocks may be deleted from the method without departing from the spirit and scope of the subject matter described herein. Furthermore, the method can be implemented in any suitable hardware, software, firmware, or combination thereof.

At block 802, previous interactions (i.e. interactions pertaining to various programs loaded for execution in a system memory before the execution of a first program) are checked. For example, query module 210 can identify potential direct extensibility point (EPs) for a first program by querying log storage 218 and/or archive collection 106 for interactions pertaining to various programs loaded into memory of one or more of computing-based devices 102 for execution before execution of the first program. Query module 210 can query for interactions pertaining to various programs loaded in memory for execution within a given time range, such as two seconds, before execution of the first program.

At block 804, a check is performed to find previous interactions which reference a filename of the first program loaded for execution in system memory of a computing-based device. For example, query module 210 can query for interactions associated with various programs referencing the first program or which are associated with the execution of the first program on computing-based devices 102. Query module 210 can query for interactions including various attributes, such as a filename of the first program, a program ID of the first program, and so on.

At block 806, the previous interactions referencing the filename of the first program are flagged as direct EPs. For example, query module 210 can identify direct EPs for the first program by querying for all previous interactions which reference the first program or which are associated with the execution of the first program.

Figure 9:
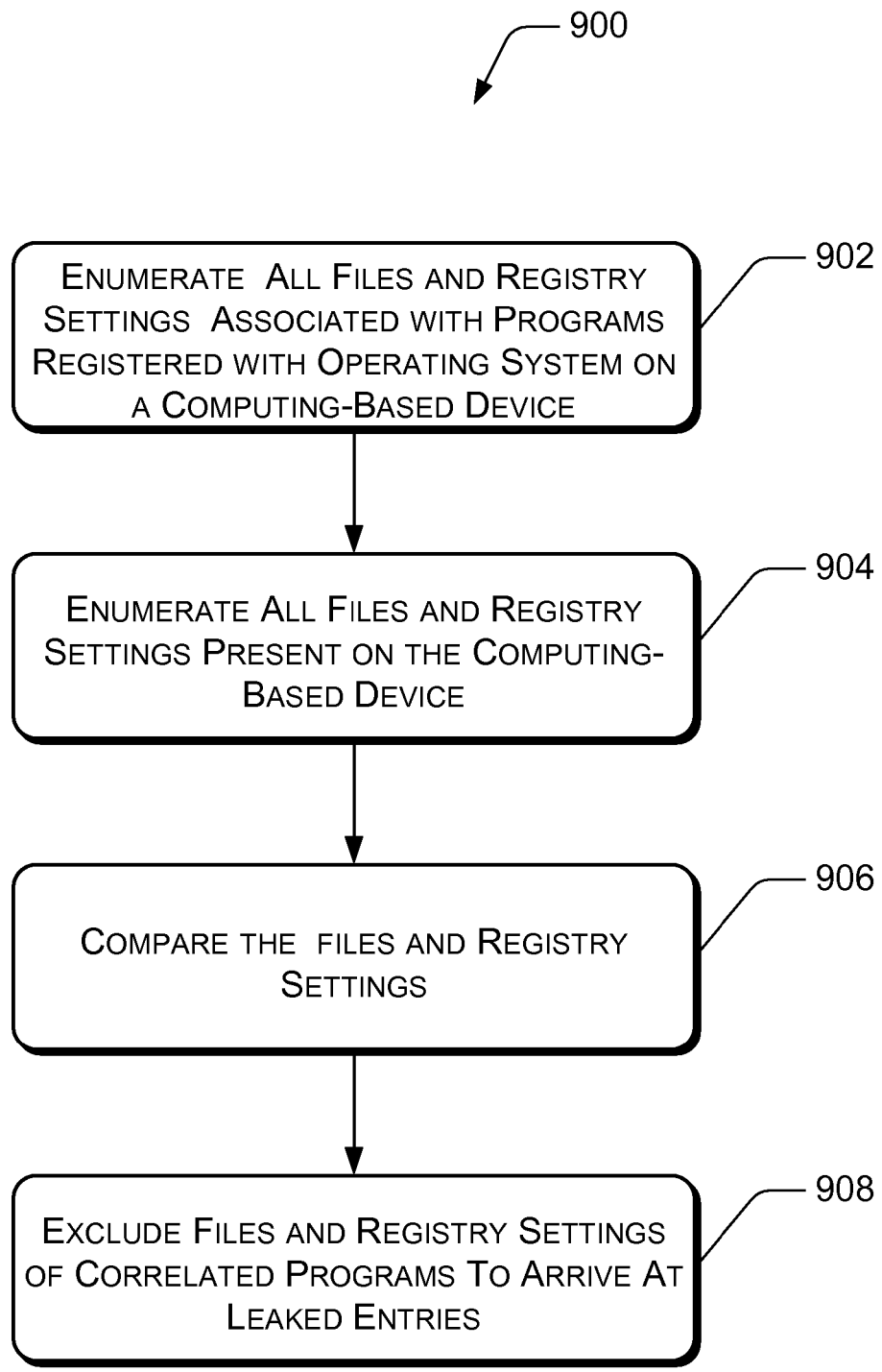
FIG. 9 illustrates exemplary method(s) for detecting leaked entries.

FIG. 9 illustrates an exemplary method 900 for detecting leaked entries that have been left behind as a result of uninstalling a program from one or more computing-based devices 102. The order in which the method is described is not intended to be construed as a limitation, and any number of the described method blocks can be combined in any order to implement the method, or an alternate method. Additionally, individual blocks may be deleted from the method without departing from the spirit and scope of the subject matter described herein. Furthermore, the method can be implemented in any suitable hardware, software, firmware, or combination thereof.

At block 902, installation files and settings changes associated with each program loaded onto a computing-based device and/or system are cataloged and enumerated. Enumeration includes creating a list of programs registered with an operating system of the computing-based device.

For example, the system 100 can be scanned to detect all programs that are installed on computing-based devices in the system as well as all operating system installation files associated with the programs on the computing-based devices. All programs installed on the computing-based devices and/or all operating system installation files associated with the programs may be enumerated by placing them in a list.

Query module 210 runs a scan through system 100 detecting all programs that are installed on one or more computing-based devices 102 to catalogue and enumerate all operating system installation files on computing-based devices 102. For example, query module 210 can query log storage 218 and/or archive collection 106 for all programs registered with operating system of one or more of computing-based devices 102 in the system 100. The programs found may be cataloged and enumerated by a variety of devices, such as query module 210, agent 110, and so on. Moreover, all operating system installation files on computing-based devices 102 associated with the programs found may be cataloged and enumerated by a variety of devices, such as query module 210, agent 110, and so on.

At block 904, persistent state (PS) present on a computing-based device and/or system, including files and registry settings associated with uninstalled programs, are enumerated. This can involve the scanning of memory on the computing-based device and/or system for files and registry settings of all programs that have been installed on the computing-based device and/or system, including files and registry settings for programs that have been uninstalled. For example, query module 210 can query log storage 218 and/or archive collection 106 to obtain all files and registry settings corresponding to identifiers, such as program IDs, of all programs that have been installed on computing-based devices 102.

At block 906, the files and registry settings associated with programs registered with the operating system are compared against the files and registry settings of programs that have been installed on the computing-based devices 102 and/or system 100. For example, query module 210 can compare identifiers, such as program IDs, of the enumerated files and registry settings associated with the programs registered with the operating system of computing-based devices 102 against identifiers of files or settings of all programs which have been installed on computing-based devices 102.

At block 908, files and registry settings associated with programs on both lists can be excluded from consideration. The remaining files and registry settings, which represent files and registry settings corresponding to programs that have been uninstalled from the computing-based device 102 and/or system 100 can be annotated as leaked files, and can be removed from the computing-based device 102 and/or system 100. For example, query module 210 can correlate identifiers, such as program IDs, of files and registry settings associated with programs registered with operating systems of computing-based devices 102 with identifiers of files and registry settings associated with programs that have been installed on computing-based devices 102. The files and registry settings associated with the non correlated programs can be termed leaked files by query module 210, and can be removed from computing-based devices 102, by elements such as query module 210, agent 110, and so on.

Figure 10:
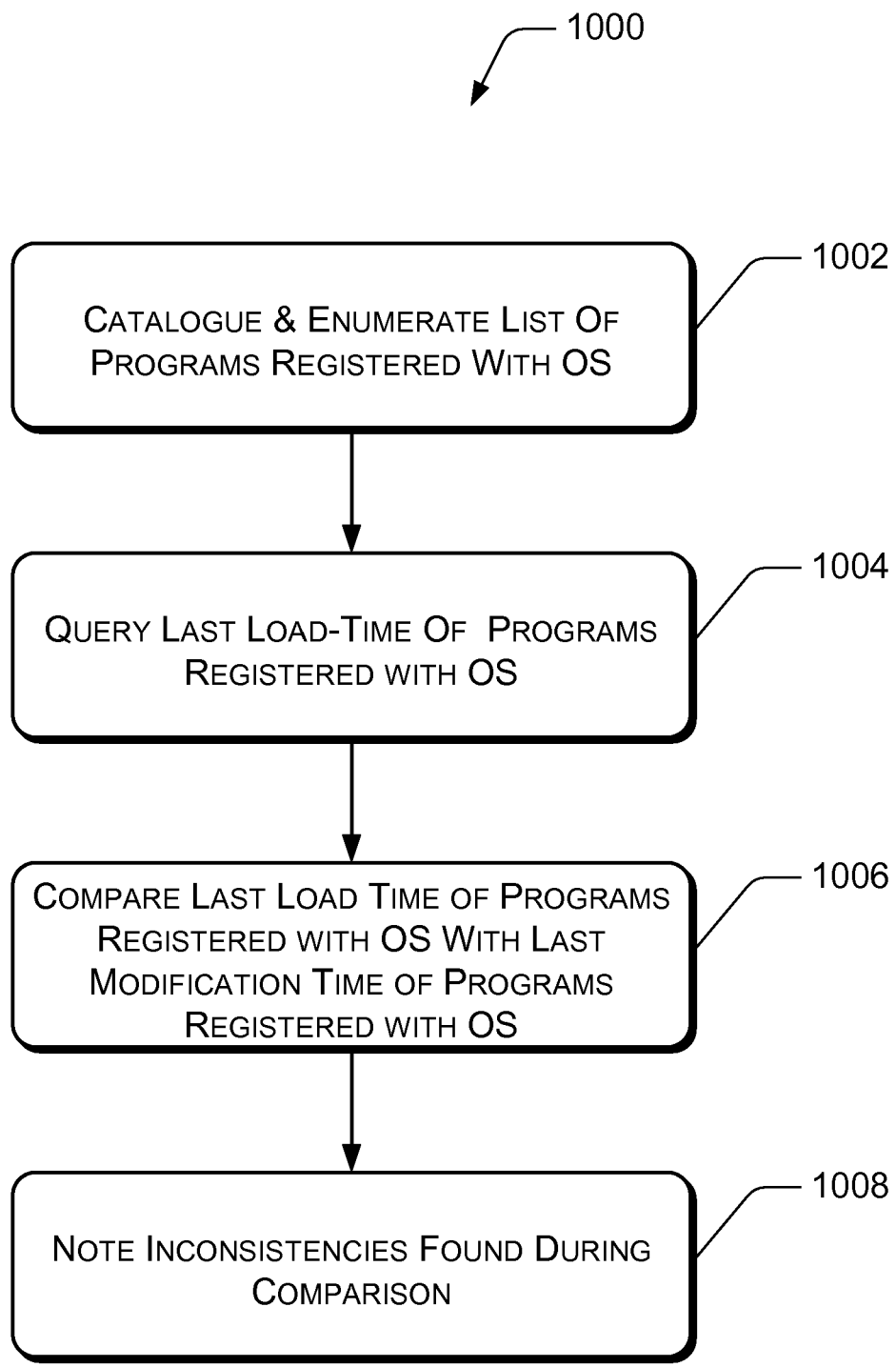
FIG. 10 illustrates exemplary method(s) for detecting common misconfigurations or stale files.

FIG. 10 illustrates an exemplary method 1000 for detecting stale files including common misconfigurations, old software versions etc., installed on one or more computing-based devices 102. Stale files occur when, for example, software upgrades fail to restart affected processes after replacing on-disk executable files. As a result, the computing-based devices 102 on which the stale file is found will disregard the upgrade and continue to execute the program from the old file. The order in which the method is described is not intended to be construed as a limitation, and any number of the described method blocks can be combined in any order to implement the method, or an alternate method. Additionally, individual blocks may be deleted from the method without departing from the spirit and scope of the subject matter described herein. Furthermore, the method can be implemented in any suitable hardware, software, firmware, or combination thereof.

At block 1002, programs loaded onto a computing-based device and/or system are cataloged and enumerated. In one implementation, enumeration includes creating a list of programs registered with an operating system of the computing-based device. For example, a system can be scanned to detect all programs that are installed on computing-based devices in the system. All programs installed on the computing-based devices may be enumerated by placing them in a list.

In one possible implementation, query module 210 runs a scan through system 100 detecting all programs that are registered on one or more computing-based devices 102 to catalog and enumerate all programs registered with operating system of the computing-based devices 102. For example, query module 210 can query log storage 218 and/or archive collection 106 for all programs registered with operating system of one or more of computing-based devices 102 in system 100. The programs found may be cataloged and enumerated by a variety of devices and/or entities, such as query module 210, agent 110, and so on.

At block 1004, last load times of all programs registered on a computing-based device and/or system, as well as for files associated with the programs registered on the computing-based device and/or system, are acquired. For example, query module 210 queries log storage 218 and/or archive collection 106 for the last-load times of programs registered on computing-based devices 102 and/or last-load times of files, such as system dynamic link libraries (DLLs) files, installed with the programs registered on computing-based devices 102 in system 100.

At block 1006, last modification times of files or settings associated with programs registered on a computing-based device and/or system are acquired and compared with the last-load times of the programs. For example, query module 210 can query log storage 218 and/or archive collection 106 for a time or date of the last modification of a program registered with operating system of computing-based devices 102. Query module 210 can compare the time or date of the last modification with a last load time of the program.

At block 1008, any inconsistencies found during the comparison are noted. For example, in case a last load time of a program registered on a computing-based device and/or system is later than a time or date of a last known modification of the program, it is possible that the program has not responded to the last modification. In such a case, an error report may be issued to entities such as a user or a system administrator, reporting that the program is not responding to the last attempted modification. Alternately, an attempt may be made to retry the last attempted modification of the program.

In one exemplary implementation, query module 210 can query for both a last load time and a last modification time of a program registered with operating system of the computing based devices 102 in system 100. Query module 210 can compare the last load time and the last modification time and if the last load time of the program is later than the last modification time of the program, query module 210 can issue an error report to entities such as a user or a system administrator, reporting that the program is not responding to the last attempted modification. In yet another implementation, query module 210 can also attempt to retry the last attempted modification of the program.

Exemplary Computer Environment

Figure 11:
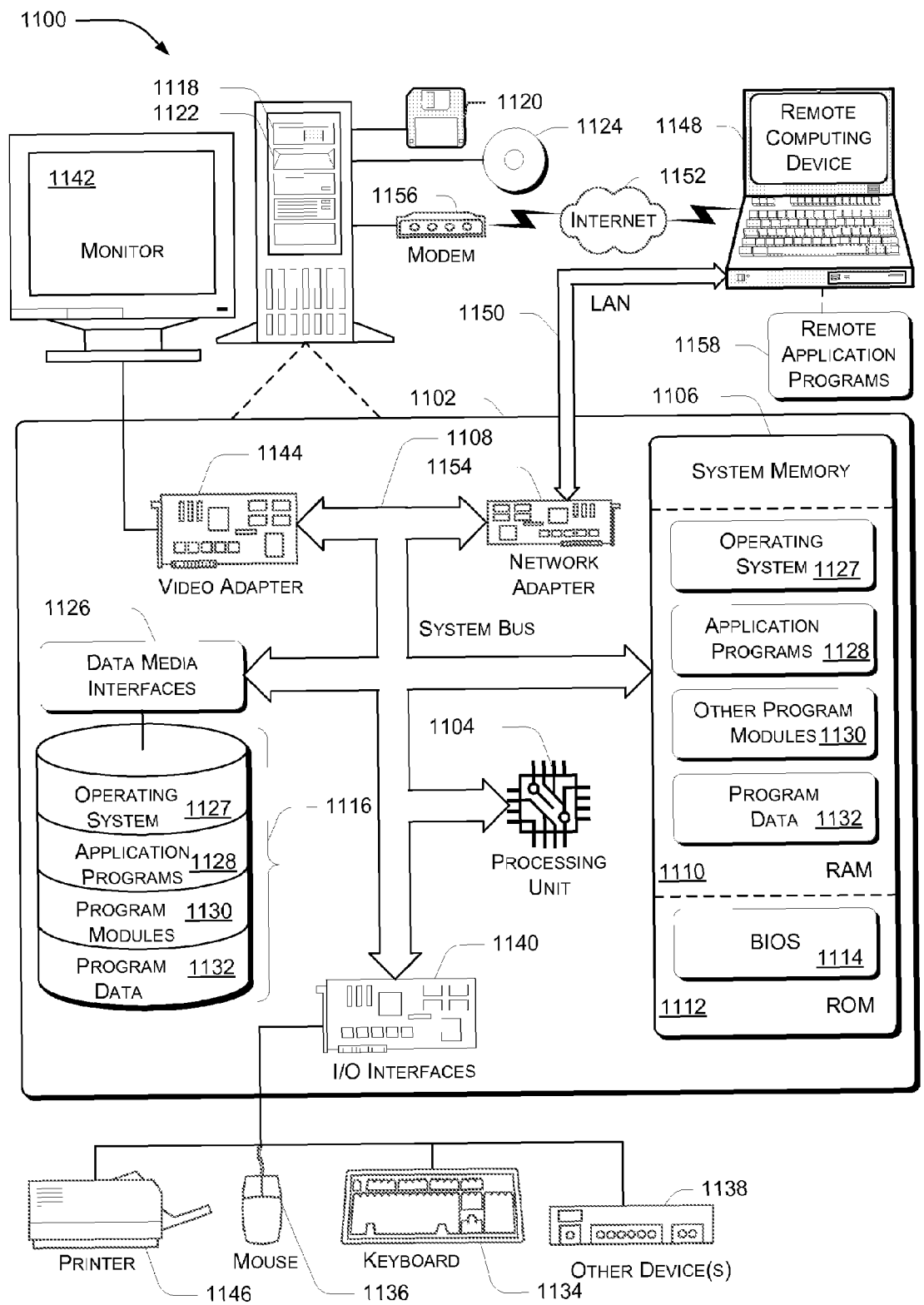
FIG. 11 illustrates an exemplary computer environment.

FIG. 11 illustrates an exemplary general computer environment 1100, which can be used to implement the techniques described herein, and which may be representative, in whole or in part, of elements described herein. The computer environment 1100 is only one example of a computing environment and is not intended to suggest any limitation as to the scope of use or functionality of the computer and network architectures. Neither should the computer environment 1100 be interpreted as having any dependency or requirement relating to any one or combination of components illustrated in the example computer environment 1100.

Computer environment 1100 includes a general-purpose computing-based device in the form of a computer 1102. Computer 1102 can be, for example, a desktop computer, a handheld computer, a notebook or laptop computer, a server computer, a game console, and so on. The components of computer 1102 can include, but are not limited to, one or more processors or processing units 1104, a system memory 1106, and a system bus 1108 that couples various system components including the processor 1104 to the system memory 1106.

The system bus 1108 represents one or more of any of several types of bus structures, including a memory bus or memory controller, a peripheral bus, an accelerated graphics port, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

Computer 1102 typically includes a variety of computer readable media. Such media can be any available media that is accessible by computer 1102 and includes both volatile and non-volatile media, removable and non-removable media.

The system memory 1106 includes computer readable media in the form of volatile memory, such as random access memory (RAM) 1110, and/or non-volatile memory, such as read only memory (ROM) 1112. A basic input/output system (BIOS) 1114, containing the basic routines that help to transfer information between elements within computer 1102, such as during start-up, is stored in ROM 1112. RAM 1110 typically contains data and/or program modules that are immediately accessible to and/or presently operated on by the processing unit 1104.

Computer 1102 may also include other removable/non-removable, volatile/non-volatile computer storage media. By way of example, FIG. 11 illustrates a hard disk drive 1116 for reading from and writing to a non-removable, non-volatile magnetic media (not shown), a magnetic disk drive 1118 for reading from and writing to a removable, non-volatile magnetic disk 1120 (e.g., a "floppy disk"), and an optical disk drive 1122 for reading from and/or writing to a removable, non-volatile optical disk 1124 such as a CD-ROM, DVD-ROM, or other optical media. The hard disk drive 1116, magnetic disk drive 1118, and optical disk drive 1122 are each connected to the system bus 1108 by one or more data media interfaces 1126. Alternately, the hard disk drive 1116, magnetic disk drive 1118, and optical disk drive 1122 can be connected to the system bus 1108 by one or more interfaces (not shown).

The disk drives and their associated computer-readable media provide non-volatile storage of computer readable instructions, data structures, program modules, and other data for computer 1102. Although the example illustrates a hard disk 1116, a removable magnetic disk 1120, and a removable optical disk 1124, it is to be appreciated that other types of computer readable media which can store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, can also be utilized to implement the exemplary computing system and environment.

Any number of program modules can be stored on the hard disk 1116, magnetic disk 1120, optical disk 1124, ROM 1112, and/or RAM 1110, including by way of example, an operating system 1127, one or more application programs 1128, other program modules 1130, and program data 1132. Each of such operating system 1127, one or more application programs 1128, other program modules 1130, and program data 1132 (or some combination thereof) may implement all or part of the resident components that support the distributed file system.

A user can enter commands and information into computer 1102 via input devices such as a keyboard 1134 and a pointing device 1136 (e.g., a "mouse"). Other input devices 1138 (not shown specifically) may include a microphone, joystick, game pad, satellite dish, serial port, scanner, and/or the like. These and other input devices are connected to the processing unit 1504 via input/output interfaces 1140 that are coupled to the system bus 1108, but may be connected by other interface and bus structures, such as a parallel port, game port, or a universal serial bus (USB).

A monitor 1142 or other type of display device can also be connected to the system bus 1108 via an interface, such as a video adapter 1144. In addition to the monitor 1142, other output peripheral devices can include components such as speakers (not shown) and a printer 1146 which can be connected to computer 1102 via the input/output interfaces 1140.

Computer 1102 can operate in a networked environment using logical connections to one or more remote computers, such as a remote computing-based device 1148. By way of example, the remote computing-based device 1148 can be a personal computer, portable computer, a server, a router, a network computer, a peer device or other common network node, and the like. The remote computing-based device 1148 is illustrated as a portable computer that can include many or all of the elements and features described herein relative to computer 1102.

Logical connections between computer 1102 and the remote computer 1148 are depicted as a local area network (LAN) 1150 and a general wide area network (WAN) 1152. Such networking environments are commonplace in offices, enterprise-wide computer networks, intranets, and the Internet.

When implemented in a LAN networking environment, the computer 1102 is connected to a local network 1150 via a network interface or adapter 1154. When implemented in a WAN networking environment, the computer 1102 typically includes a modem 1156 or other means for establishing communications over the wide network 1152. The modem 1156, which can be internal or external to computer 1102, can be connected to the system bus 1108 via the input/output interfaces 1140 or other appropriate mechanisms. It is to be appreciated that the illustrated network connections are exemplary and that other means of establishing communication link(s) between the computers 1102 and 1148 can be employed.

In a networked environment, such as that illustrated with computing environment 1100, program modules depicted relative to the computer 1102, or portions thereof, may be stored in a remote memory storage device. By way of example, remote application programs 1158 reside on a memory device of remote computer 1148. For purposes of illustration, application programs and other executable program components such as the operating system are illustrated herein as discrete blocks, although it is recognized that such programs and components reside at various times in different storage components of the computing-based device 1102, and are executed by the data processor(s) of the computer.

Various modules and techniques may be described herein in the general context of computer-executable instructions, such as program modules, executed by one or more computers or other devices. Generally, program modules include routines, programs, objects, components, data structures, etc. that performs particular tasks or implement particular abstract data types. Typically, the functionality of the program modules may be combined or distributed as desired in various embodiments.

An implementation of these modules and techniques may be stored on or transmitted across some form of computer readable media. Computer readable media can be any available media that can be accessed by a computer. By way of example, and not limitation, computer readable media may comprise "computer storage media" and "communications media."

"Computer storage media" includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

Alternately, portions of the framework may be implemented in hardware or a combination of hardware, software, and/or firmware. For example, one or more application specific integrated circuits (ASICs) or programmable logic devices (PLDs) could be designed or programmed to implement one or more portions of the framework.

CONCLUSION

Although embodiments of system management and analysis have been described in language specific to structural features and/or methods, it is to be understood that the subject of the appended claims is not necessarily limited to the specific features or methods described. Rather, the specific features and methods are disclosed as exemplary implementations of system management and analysis.

What is claimed is:

1. A method implemented on a computing device by a processor configured to execute instructions that, when executed by the processor, direct the computing device to perform acts comprising:
   detecting stale files;
   cataloging programs loaded onto the computing device;
   acquiring last load times of files associated with the programs that are registered on the computing device;
   acquiring last modification times of the files associated with the programs that are registered on the computing-based device; and
   comparing the last modification times with the last load times of the files associated with the programs that are registered on the computing device; and
   noting any inconsistencies found during the comparing, that includes a report that the program is not responding to a last attempted modification, and an attempt to retry the last attempted modification of the program.

2. The method of claim 1, wherein the cataloging comprises creating a list of programs registered with an operating system of the computing-based device.

3. The method of claim 1, wherein the cataloging comprises enumerating the programs by placing the program in a list.

4. The method of claim 1, wherein the cataloging comprises scanning to detect all the programs registered on the computing-based device.

5. The method of claim 1, wherein the acquiring comprises querying a log file.

6. The method of claim 1, wherein the comparing comprises querying a log file.

7. A computing device comprising:
   a processor unit;
   a log storage component configured to store:
      last load times of files associated with programs registered on the computing device; and
      last modification times of the files associated with the programs registered on the computing device; and
   a query log component configured to:
      catalog the programs registered on the computing device; and
      compare the last modification times with the last load times to detect stale files in the computing device, wherein a presence of stale files results to disregarding of an upgrade in the programs, wherein the disregarding of the upgrade will continue to execute the programs from old files;
   report the stale files to entities such as a user or system administrator, the report includes the program that is not responding to last attempted modification, and an attempt to retry last attempted modification of the programs.

8. The computing device of claim 7 further comprising archive collection components configured to store the last load times and the last modification times of the files associated with the programs registered on the computing device.

9. The computing device of claim 7, wherein the last load times and the last modification times include dates of the last load times and the last modification times.

10. The computing device of claim 7, wherein the query log component is further configured to scan all the programs registered on the computing-based device.

11. A computer-readable storage media having computer-readable instructions thereon which, when executed by a computer, implement a method comprising:
    cataloging and enumerating files and settings associated with programs registered on a computing-based device;
    acquiring last load times and dates of the files and the settings associated with the programs that are registered on the computing-based device;
    acquiring last modification times and dates of the files and the settings associated with the programs that are registered on the computing-based device; and
    comparing the last modification times and dates with the last load times and dates of the files and the settings associated with the programs that are registered on the computing-based device, wherein the comparing further includes noting inconsistencies in the programs registered in the computing-based device that generates a report that includes the program that is not responding to last attempted modification.

12. The computer-readable storage media of claim 11, wherein the comparing further includes comparing files and settings associated with uninstalled programs registered in the computing-based device to determine leaked files.

13. The computer-readable storage media of claim 12, wherein the leaked files are removed from the computing-based device.

14. The computer-readable storage media of claim 11, wherein the comparing comprises querying a log file.

* * * * *

UNITED STATES PATENT AND TRADEMARK OFFICE
CERTIFICATE OF CORRECTION

PATENT NO. : 7,698,305 B2  
APPLICATION NO. : 11/566170  
DATED : April 13, 2010  
INVENTOR(S) : Chad Verbowski et al.

Page 1 of 1

It is certified that error appears in the above-identified patent and that said Letters Patent is hereby corrected as shown below:

In cover page, item (57), under "Abstract" column 2, line 4, after "for" insert -- the --.

Signed and Sealed this
Twenty-second Day of February, 2011

David J. Kappos
*Director of the United States Patent and Trademark Office*